United States Patent [19]

Gababa et al.

[11] Patent Number: 5,247,056
[45] Date of Patent: Sep. 21, 1993

[54] PARA-PHENYLENE DIAMINE POLYMER COLOR IMPROVEMENT

[75] Inventors: Vlodek Gababa; Angela M. LaPallo, both of Richmond, Va.

[73] Assignee: E. I. du Pont de Nemours and Company, Wilmington, Del.

[21] Appl. No.: 644,387

[22] Filed: Jan. 22, 1991

Related U.S. Application Data

[62] Division of Ser. No. 431,227, Nov. 3, 1989, Pat. No. 5,057,602.

[51] Int. Cl.$^5$ ............................................. C08G 69/46
[52] U.S. Cl. ................................... 528/348; 528/336
[58] Field of Search ............... 528/348, 336, 486, 492, 528/499, 422

[56] References Cited

U.S. PATENT DOCUMENTS

| | | | |
|---|---|---|---|
| 3,415,611 | 12/1968 | Callahan et al. | 8/137.5 |
| 3,475,771 | 11/1969 | Quynn et al. | 8/173 |
| 3,819,587 | 6/1974 | Kwoleck | 260/78 R |
| 4,308,374 | 12/1981 | Vollbracht et al. | 528/336 |
| 4,650,624 | 3/1987 | Reinehr et al. | 264/143 |
| 5,057,602 | 10/1991 | Gabara et al. | 528/486 |

FOREIGN PATENT DOCUMENTS 58-40306 3/1983 Japan.

Primary Examiner—Harold D. Anderson

[57] ABSTRACT

A process is provided for increasing the brightness and decreasing the discoloration of PPD polymer during the polymer production. Sequestering agents having a stability constant ($K_1$), for Fe(III), greater than about 12 are slurried with the PPD polymer in water and then rinsed, neutralized, and dried.

4 Claims, 2 Drawing Sheets

PARA-PHENYLENE DIAMINE POLYMER COLOR IMPROVEMENT

This is a division of application Ser. No. 07/431,227, filed Nov. 3, 1989, now U.S. Pat. No. 5,057,602.

BACKGROUND OF THE INVENTION

1. Field of the Invention

Para-phenylene diamine (PPD) polymer is subject to an excessive and, until now, uncontrolled and unpredictable discoloration in isolation of the polymer from low-temperature solution polymerization. Discolored polymer yields discolored products and, even if the discoloration is not, of itself, unacceptable, discoloration of inconsistent degrees may well be unacceptable. This invention relates to a process for preparing PPD polymer having an improved color uniformity from run to run.

Description of the Prior Art

Prior to the present invention, it has been the practice to isolate PPD polymer from the solution polymerization media by washing in water without particular regard to the wash water or materials contained therein.

U.S. Pat. No. 4,308,374, issued Dec. 29, 1981 on the application of Vollbracht et al. discloses that poly-p-phenylene terephthalamide is isolated by mixing the reaction mixture with water or aqueous alkali. There is no mention of treatment to control discoloration in the polymer product.

U.S. Pat. Nos. 3,819,587 and 3,869,429, issued Jun. 25, 1974 and Mar. 4, 1975 on the applications of Kwolek and Blades, respectively, disclose that polyamides are isolated by being vigorously stirred with water and then filtered. Those patents, further, state that one of the washes may contain sodium carbonate or hydroxide. Neither patent is concerned with polymer discoloration.

Japanese Application Publication (Kokai) 58-40,306, published Mar. 9, 1983 discloses addition of alkali metal or ammonium salt of ethylenediaminetetraacetic acid to water-soluble acrylic copolymers to maintain the polymer water-solubility during pulverization. There is no mention of polymer discoloration.

U.S. Pat. No. 4,650,624, issued Mar. 17, 1987 on the application of Reinehr et al., discloses that EDTA can be used to increase the whiteness of dry spun acrylic fibers. The EDTA is added to the spinning solution and has nothing to do with production of the acrylic polymer.

U.S. Pat. No. 3,415,611, issued Dec. 10, 1968 on the application of Callahan et al., discloses that EDTA can be used to increase the whiteness of wet spun acrylonitrile fibers. The EDTA is added to the spinning solution or to spun fibers in the gel state and has nothing to do with production of the acrylonitrile polymer.

SUMMARY OF THE INVENTION

The present invention provides a process for preparing PPD polymer of reduced discoloration wherein polymer isolation from the solution polymerization medium includes treatment with a sequestering agent. The sequestering agent can be any aminocarboxylic acid having a stability constant ($K_1$), for Fe(III), of greater than about 12; and the treatment should include addition of the sequestering agent to the unisolated PPD polymer before the pH of the polymer system has been raised above 2. The PPD polymer which is most usually used in practice of this invention is poly(p-phenylene terephthalamide) (PPD-T).

DETAILED DESCRIPTION OF THE INVENTION

Figure 1:
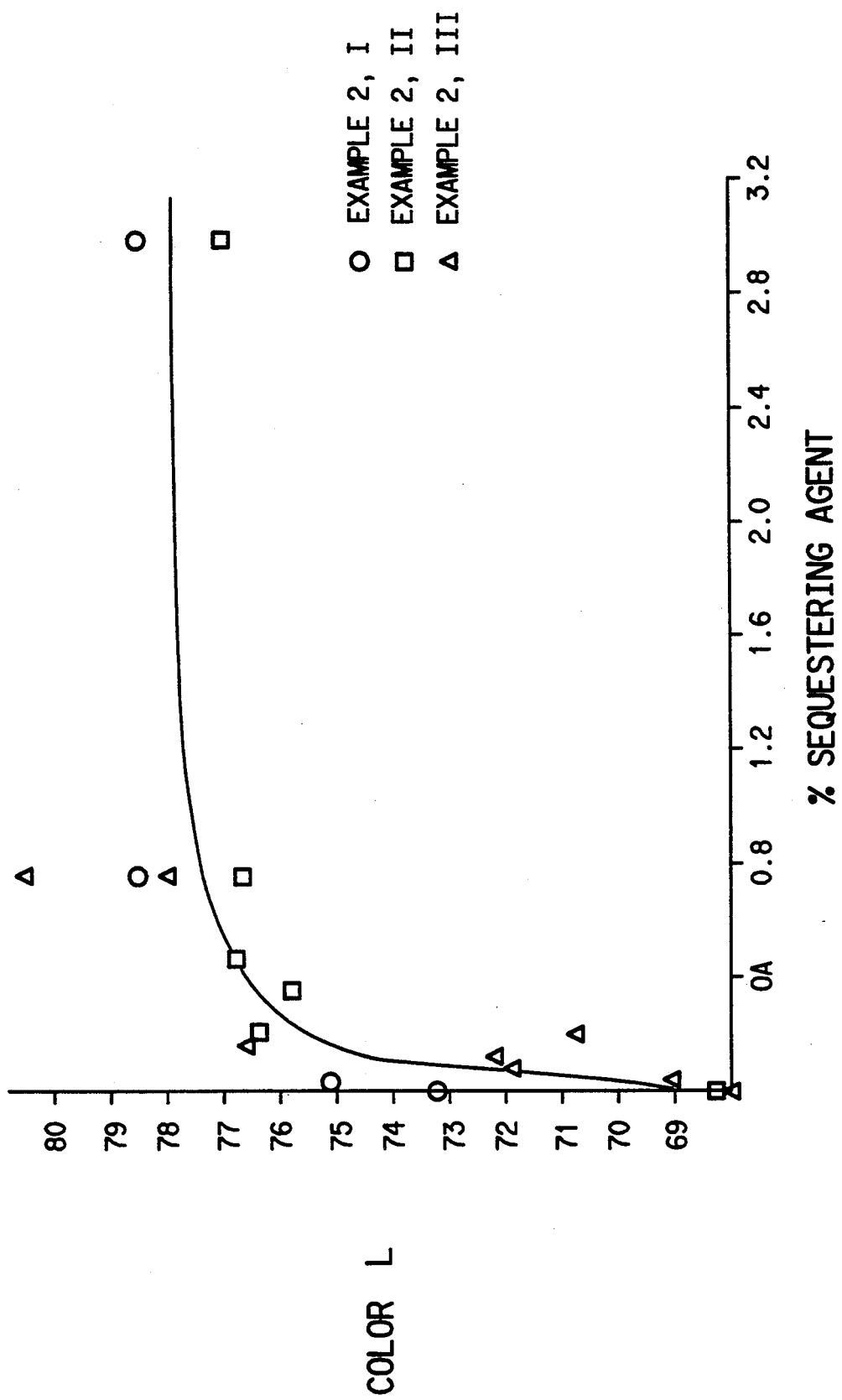
FIG. 1 is a graphical representation of Color L (Brightness) versus the concentration of sequestering agent used for treating PPD-T by the process of this invention.

Discoloration of PPD polymer during the polymer production, has been a continuing problem. At some times, there have been excessive discoloration and from time-to-time in the same process there have been varying degrees of discoloration. It has been desired to minimize the discoloration and to make the degree of color uniform over a long course of polymer production.

Although the reason for the effect is not entirely understood, it has now been discovered that discoloration of PPD polymer can be decreased and controlled by addition of particular sequestering agents to the polymer system prior to final washing and drying. The sequestering agents can be added to PPD polymer newly-isolated from the polymerization system before neutralization, that is, before the PPD polymer has been exposed to a pH greater than about 2, and, preferably before a pH greater than about 1. The sequestering agent could be added to the polymerization system before the polymerization is completed if it doesn't interfere with the polymerization reaction.

By PPD polymer is meant any polymer resulting from mole-for-mole polymerization of p-phenylene diamine with a coreactant and, also, copolymers resulting from incorporation of other diamines with the p-phenylene diamine. As a general rule, other diamines can be used in amounts up to as much as about 50 mole percent of the total diamine. It is believed that discoloration of PPD polymers is caused by impurities in the PPD or generated by reaction of the PPD; and that the discoloration can be decreased by the process of the present invention in polymers having at least 25 total mole percent PPD.

The present invention has been most often used with PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or choro- or dichloroterephthaloyl chloride; provided, only, that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

PPD polymer, for treatment by the process of this invention, is prepared by polymerization in a liquid medium and is isolated from the polymerization system by washing with water. The treatment process of this invention can be conducted in the polymerization system or in any of the washes. The process is preferably conducted in the first wash, at first contact of the polymer with water and before the pH of the system is greater than 2 and, preferably, before the pH is greater that 1. The polymerization system for PPD-T generally yields a product which is a granular, solid, mass with a dry appearance; but containing only about 5-15% PPD-T. That polymer product is named herein, and is well-known by workers in this art to be, "acid crumb".

In conduct of the process of this invention, the acid crumb is combined with water in an amount adequate to yield an aqueous slurry of the polymer. Water is usually used in an amount 5 to 50 times the weight of the polymer in the crumb and with the sequestering agent in an appropriate amount. The combination of PPD polymer, sequestering agent, and water is agitated for a time adequate to permit contact of substantially all of the PPD polymer with the sequestering agent. A time of as little as 10 seconds of agitation has been deemed to be adequate for systems having efficient agitation. The process of this invention can be conducted in a batch manner or as a continuous process;—care being taken, in the case of a continuous process, to maintain the amounts of the various component streams within the appropriate ranges.

Sequestering agents useful in the practice of this invention include compounds having stability constants, for Fe(III), of greater than about 12. Sequestering agents which are particularly useful are aminocarboxylic acids having $K_1 > 12$ for Fe(III). Particularly preferred are ethylenediamine tetraacetic acid (EDTA) having $K_1 = 25.1$ and nitrilotriacetic acid (NTA) having $K_1 = 15.9$ for Fe(III). It has been concluded that sequestering agents having low stability constants are not effective in this invention. For example, it has been found that citric acid having $K_1 = 11.4$ for Fe(III) and sodium tripolyphosphate having $K_1 = 3.6$ for Fe(III) cannot be used to practice this invention.

The benefits of this invention are realized by addition of any amount of sequestering agent. Very small amounts of the agent may yield small improvement. Generally, good results are obtained by use of about 0.25 to 0.75% of the sequestering agent based on the weight of PPD polymer to be treated. As stated, less of the agent can be used for diminished effect. Noticeable improvement in brightness can be obtained by as little as 0.1% EDTA based on weight of PPD polymer. More than 0.75% of the sequestering agent can be used; but amounts in excess of about 0.75% do not appear to provide substantial additional benefit. The brightness of PPD polymer treated by 3.0% sequestering agent is about the same as PPD polymer treated by 0.75% of the same agent.

Color determinations are made using a Hunter Lab Tristimulus Colorimeter model D25M-9 such as that sold by Hunterlab of Reston, Va., USA. Brightness of polymer for this invention was determined by measuring the "L" color component. The "L" color component is a measure of the blackness or whiteness of a polymer sample on a scale from 0 (black) to 100 (white).

For the purposes of this invention, the absolute values of the "L" value determined from the test are not important. The differences in color between treated and untreated polymers are easily seen by relative values from the treated polymers to the controls. Color improvements resulting from practice of this invention can be determined using any sensitive colorimeter to compare treated and untreated polymers.

DESCRIPTION OF THE PREFERRED EMBODIMENTS

EXAMPLE 1

This example describes practice of the process of this invention using EDTA and PPD-T.

PPD-T was made in accordance with the teachings of U.S. 4,308,374 to yield an acid crumb of about 11% polymer and having a dry appearance. Three hundred weight parts of the acid crumb were mixed with 500 weight parts of distilled water to form a slurry. The pH of the slurry was about 0.6. It was estimated that the filter cake contained about 33 weight parts of PPD-T. To the slurry of PPD-T, still being mixed, was added 0.25 weight parts of EDTA sequestering agent (0.75%, based on the weight of the PPD-T). The pH of the system was adjusted to 6.0 using sodium hydroxide solution, and the system was agitated for about ten more minutes.

After mixing the polymer with the sequestering agent, the system was filtered and the filter cake was slurried and filtered four more times using about 750 weight parts of water each time. Finally, the filter cake was dried in an oven for about 16 hours at about 140° C.

As a control, the above procedure was followed omitting addition of the sequestering agent.

Color determinations were conducted on the products of this example in accordance with the color determination test method described above. It should be noted that color differences of only two units on the color scale are easily detected by the unaided eye. The color of the polymer treated by this invention was 78.0 and the color of the control was 68.2.

EXAMPLE 2

In this example, the procedure of Example 1 was followed with the exception that different amounts of sequestering agent were added to the slurry in different runs. Results of the several runs are shown in the table, below, and are, also, depicted in the graphical representation of FIG. 1. The column headed "$\Delta L$" shows the color difference between the treated ppd-T and the Control PPD-T. Note that the runs of this example were conducted on polymer made on three different occasions and that, as a consequence, the color of the controls is slightly different from batch to batch.

| Batch | % sequestering agent | Color L | $\Delta L$ |
| --- | --- | --- | --- |
| I | None (control) | 73.2 | — |
|  | 0.03 | 75.1 | 1.9 |
|  | 0.75 | 78.6 | 5.4 |
|  | 3.00 | 78.5 | 5.3 |
| II | None (control) | 68.2 | — |
|  | 0.15 | 76.5 | 8.3 |
|  | 0.30 | 75.8 | 7.6 |
|  | 0.45 | 76.9 | 8.7 |
|  | 0.75 | 76.8 | 8.6 |
|  | 3.00 | 77.1 | 8.9 |
| III | None (control) | 68.0 | — |
|  | 0.03 | 69.1 | 1.1 |
|  | 0.06 | 71.9 | 3.9 |

-continued

| Batch | % sequestering agent | Color L | ΔL |
|---|---|---|---|
| | 0.09 | 72.1 | 4.1 |
| | 0.12 | 76.7 | 8.7 |
| | 0.15 | 70.8 | 2.8 |
| | 0.75 | 78.1 | 10.1 |
| | 0.75 | 80.3 | 12.3 |

EXAMPLE 3

Figure 2:
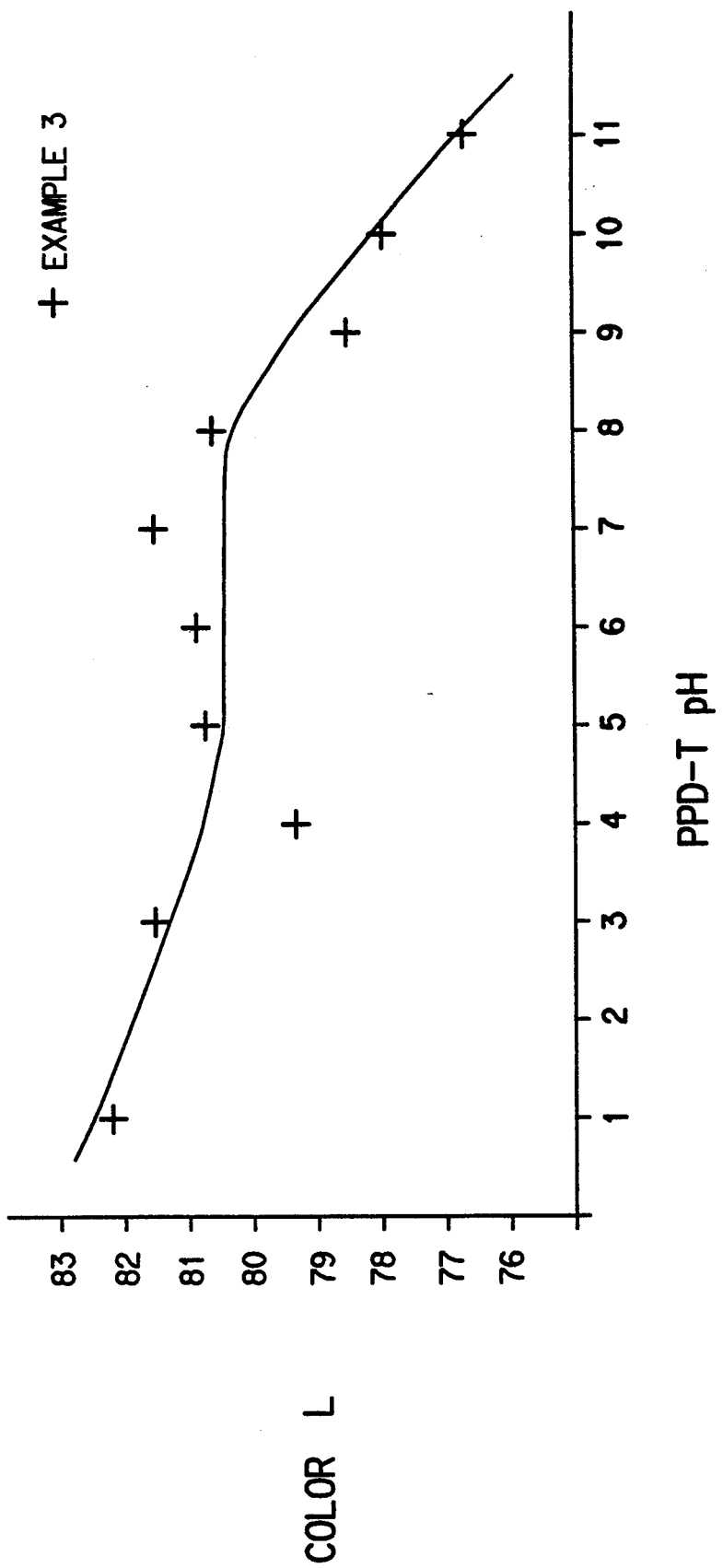
FIG. 2 is a graphical representation of Color L (Brightness) versus the pH of the treatment system at constant concentration of sequestering agent to show that practice of the process of this invention is substantially independent of pH below a pH of about 8 or 9.

In this example, the procedure of Example 1 was followed with the exception that the pH of the initial slurry was adjusted to have different values for different runs. Results of the several runs are shown in the table, below, and are, also, depicted in the graphical representation of FIG. 2. The amount of sequestering agent was maintained at 0.75%, based on polymer weight. The control was PPD-T maintained at pH 6 with no sequestering agent treatment.

| pH | Color L |
|---|---|
| 6 (control) | 69.0 |
| 1 | 82.2 |
| 3 | 81.6 |
| 4 | 79.4 |
| 5 | 80.8 |
| 6 | 80.9 |
| 7 | 81.6 |
| 8 | 80.7 |
| 9 | 78.6 |
| 10 | 78.0 |
| 11 | 76.7 |

EXAMPLE 4

In this example, the procedure of Example 1 was followed with the exception that different sequestering agents were used for different runs. Results of the runs are shown in the table, below. The amount of sequestering agent was maintained at 0.75%, based polymer weight.

| Sequestering Agent | Color L | ΔL |
|---|---|---|
| None (control) | 69.0 | — |
| Na$_2$ EDTA* | 78.6 | 9.6 |
| Na$_2$ NTA** | 78.6 | 9.6 |
| Na$_3$ Citric Acid*** | 71.9 | 2.9 |

-continued

| Sequestering Agent | Color L | ΔL |
|---|---|---|
| Sodium Tripolyphosphate | 71.4 | 2.4 |

*disodium salt of EDTA
**disodium salt of NTA
***trisodium salt of Citric Acid

We claim:

1. A process for making paraphenylene diamine polymer of reduced discoloration comprising the steps of;
   a) polymerizing p-phenylene diamine and a diacid chloride in a liquid polymerization medium to yield an acid crumb of para-phenylene diamine polymer;
   b) combining the acid crumb, at least 0.1%, based on weight of the para-phenylene diamine polymer, of a sequestering agent having a stability constant ($K_1$), for Fe(III), of greater than 12, and water in an amount adequate to yield a slurry of the para-phenylene diamine polymer;
   c) agitating the combination for at least ten seconds;
   d) separating the para-phenylene diamine polymer from the combination.

2. The process of claim 1 comprising additional steps of:
   e) combining the separated para-phenylene diamine polymer with water in an amount adequate to yield a slurry of the para-phenylene diamine polymer;
   f) agitating the combination for at least ten seconds;
   g) separating the para-phenylene diamine polymer from the combination;
   g) optionally, repeating steps e), f), and g).

3. A process for making para-phenylene diamine polymer of reduced discoloration comprising the steps of:
   a) polymerizing p-phenylene diamine and a diacid chloride in a liquid polymerization medium containing at least 0.1%, based on the weight of the paraphenylene diamine polymer to be made, of a sequestering agent having a stability constant ($K_1$), for Fe(III), of greater than 12;
   b) combining the para-phenylene diamine polymer with water in an amount adequate to yield a slurry of the para-phenylene diamine polymer;
   c) agitating the combination for at least ten seconds;
   d) separating the para-phenylene diamine polymer from the combination.

4. The process of claim 3 comprising additional steps of:
   e) combining the separated para-phenylene diamine polymer with water in an amount adequate to yield a slurry of the para-phenylene diamine polymer;
   f) agitating the combination for at least ten seconds;
   g) separating the para-phenylene diamine polymer from the combination;
   h) optionally, repeating steps e), f), and g).

* * * * *